Patented Jan. 13, 1931

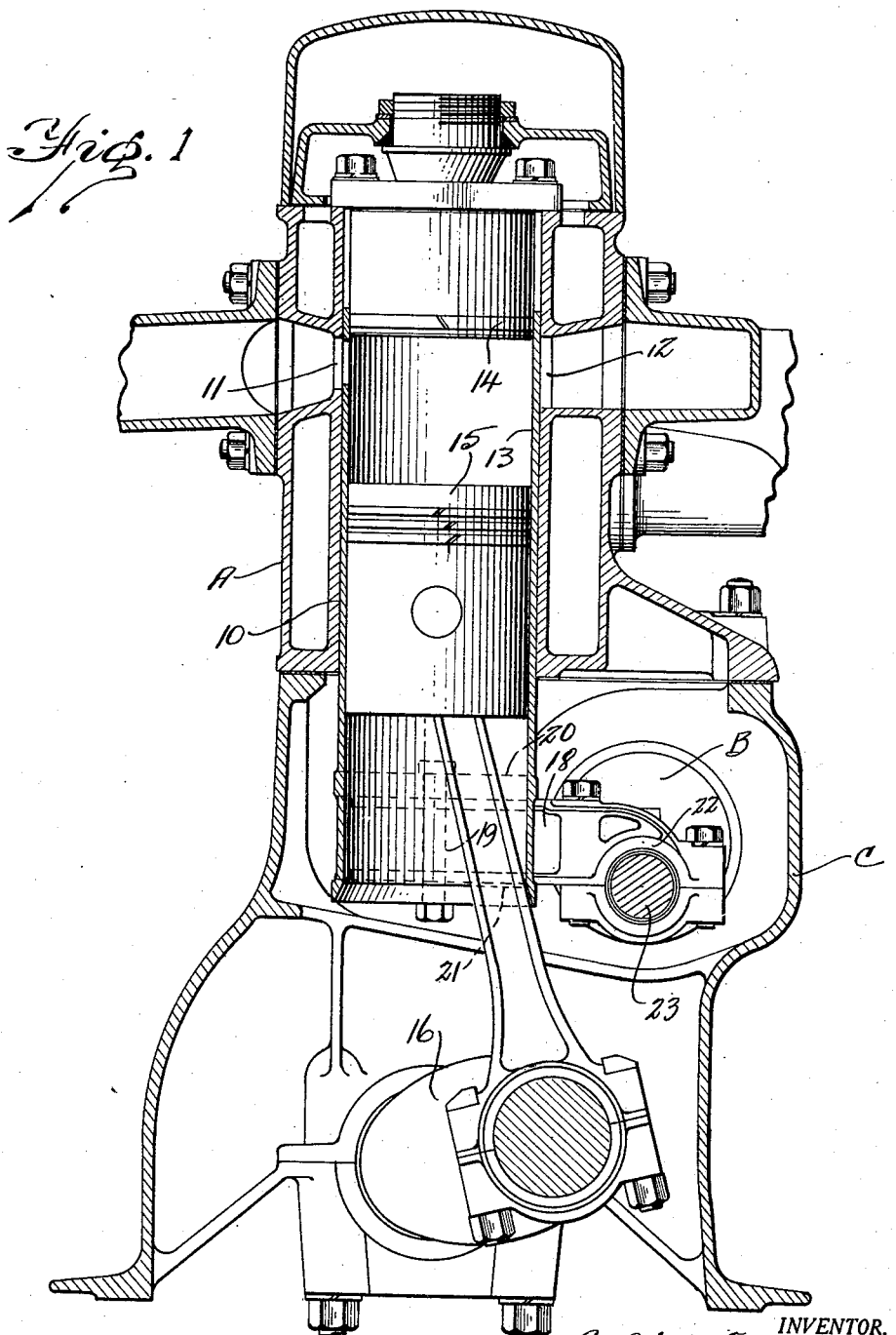

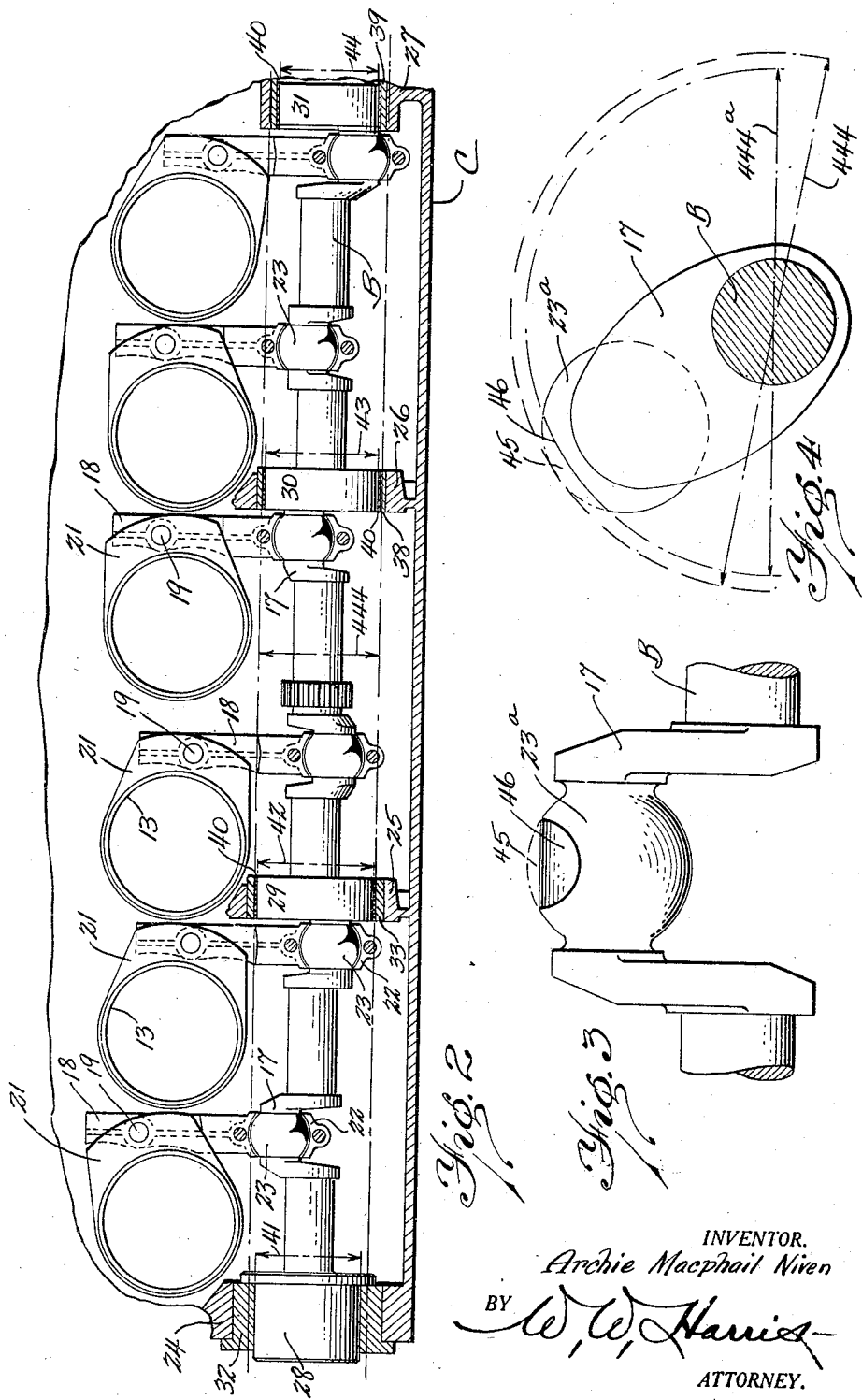

1,788,930

UNITED STATES PATENT OFFICE

ARCHIE MACPHAIL NIVEN, OF DETROIT, MICHIGAN, ASSIGNOR TO CONTINENTAL MOTORS CORPORATION, OF DETROIT, MICHIGAN, A CORPORATION OF VIRGINIA

INTERNAL-COMBUSTION ENGINE

Application filed April 6, 1928. Serial No. 267,820.

This invention relates to internal combustion engines and refers more particularly to an improved valveshaft and valveshaft bearing construction for operating the valve mechanism of multi-cylinder engines. For purposes of illustrating my invention I have shown my improvements in connection with an engine of the sleeve valve type.

My invention has particular reference to engine constructions in which the valveshaft bearing bosses or housings are solid as by casting the same with the crankcase structure, in contrast with split valveshaft bearing housings having a separate cap. The former generally well known type of valveshaft bearing housings is preferable for quantity production by reason of the economy in production and relatively lower cost. In this type of construction it is customary to provide spaced solid valveshaft bearing housings which are machined in line by a boring bar stepped at successive housings to permit axial insertion and removal of the boring bar and machining of the housing cylindrical openings. In this type of construction it is apparent that the valveshaft must be assembled axially through the bearing housings, with the result that the valveshaft bearing housings are usually of large diameter in order to clear the valveshaft cranks or other actuators. This gives rise to undesirably high rubbing speeds at the running surfaces of the valveshaft and housings therefor. It is an object of my invention to provide a construction of the aforesaid general character in which at least certain of the valveshaft bearings may be appreciably reduced in diameter materially reducing the rubbing speed with consequent better bearing wearing qualities, longer engine life, and a general saving in material. A further object of my invention resides in a valveshaft and bearing housing construction in which the valveshaft axis may be located closer than usual to the cylinders, an advantage derived by reason of the relatively reduced valveshaft bearing diameters and of considerable importance and advantage where the valveshaft drives one or more sleeve valves or the like. Thus the driving distance may be reduced by reason of my invention affording a more positive and a stronger drive.

Further objects and advantages of my invention will be apparent from the following illustrative description and appended claims.

Referring to the accompanying drawings,

Fig. 1 is a sectional elevation view through a typical cylinder of the sleeve valve type, Fig. 2 is a plan view looking upwardly toward the lower ends of the sleeve valves, the valveshaft bearing housings being shown in section, and Figs. 3 and 4 are enlarged detail views at right angles with each other illustrating a modified valveshaft crank construction.

In the drawings, reference character A represents the cylinder block having a plurality of cylinders 10 suitably ported for intake and exhaust at 11 and 12 respectively. Fig. 1 illustrates my invention in connection with an engine of the single sleeve valve Burt-McCollum type in which a ported sleeve valve 13 for each cylinder has a combined reciprocating and oscillating movement in controlling the valving functions of the engine. 14 is the usual cylinder head and 15 the usual piston operating the crankshaft 16. For imparting the desired movement to the sleeves, I have provided a valveshaft B driven in the customary manner from the crankshaft. This valveshaft extends parallel to the crankshaft 16 and to one side of the sleeves 13 and is formed at intervals with cranks 17. Links 18 are pivotally connected at 19 to the respective sleeve valves and operate between sleeve ears 20, 21 which restrain the links to occupy successive parallel positions, the links 18 being driven from the respective cranks 17 preferably through a connection formed by link sockets 22 and crank balls 23.

The engine crankcase structure C is formed with spaced bearing bosses or housings, the number and location of which are dependent on the number of engine cylinders, necessary support for the valveshaft, the character and arrangement of valve mechanism, and like factors. In the illustrated embodiment the engine has six cylinders, the valveshaft B having front bearing housing 24, intermediate bearing housings 25, 26 and rear bearing housing 27, these housings being of the solid or non-split type aforesaid. These housings are cylindrically bored preferably with diameters decreasing rearwardly and are preferably lined with some bearing material which has a running fit with the corresponding valveshaft bearings 28, 29, 30 and 31. Thus the bearing housings may be respectively fitted with bushings 32, 33, 38, 39 which in turn may, if desired, be lined with babbit 40 forming bearing surfaces journalling the valveshaft bearings. Thus the valveshaft bearings 28, 29, 30, 31 are journalled in valveshaft bearing housing structures having cylindrical bearing surfaces of diameters 41, 42, 43, 44 respectively. The rear housing of diameter 44 presents no difficulties in assembling the valveshaft since it is usually relatively small compared to the diameters of the other bearing housings, and since the bearing 31 is fitted without first requiring passage of any of the cranks 17 through the diameter 44. However in fitting the intermediate bearings 29, 30 within the diameters 42, 43 it is apparent that the cranks to the right of any such bearing must first be passed through the housing for the particular bearing under consideration. This is true because the valveshaft must be assembled by "threading" the same from left to right through the bearing housing openings. Now with this in mind I desire to point out that heretofore it has been deemed necessary to have the diameters 42, 43 at least as great as the maximum projected diameter of the valveshaft portions which must be passed therethrough, resulting in objectionably large diameter valveshaft bearings and consequent high rubbing speeds. Thus, for illustration, the diameter 444 represents the projected diameter of the circle traced by the outermost points of the crank balls 23, and it is apparent that any housing diameter at least equal to 444 (or slightly greater than 444 for clearance) will freely permit axial movement of the valveshaft therethrough. I have discovered, however, that the diameters 42, 43 may be made appreciably and considerably less than the diameter 444 and when so formed the valveshaft may be assembled by threading the same axially through the housing openings and by tilting the valveshaft as required to clear the cranks 17. This assembly is facilitated by making the forward housing 24 of a diameter greater than the diameter 44 by an amount sufficient to permit the aforesaid assembly of the valveshaft, the bushing 32 in the case of this forward housing being inserted after assembly of the valveshaft.

As a further advantage of my invention the axis of the valveshaft is brought closer to the sleeve valves, thus providing a more compact, more direct, and stronger driving mechanism.

If it is desired to reduce the valveshaft intermediate bearings still further, I may reduce the diameter 444 by removing the outermost portions 45 of the crank balls 23$^a$ as illustrated in Figs. 3 and 4. In such instance the diameter 444 will be reduced by an amount equal to twice the radial dimension of the portion 45, resulting in a diameter 444$^a$ corresponding to diameter 444. Thus the intermediate bearings of the valveshaft may be likewise further reduced utilizing the construction illustrated in Figs. 3 and 4. A consequent further reduction in bearing speeds and closer positioning of the valveshaft axis to the sleeves would be obtained. I find it convenient in removing the crank ball portions 45 to rotate the valveshaft on its axial centers, a suitable cutter being brought into contact with the crank ball ends for removing the material 45 resulting in a circumferential flattened ball end 46. In Figs. 3 and 4 the removal of the portion 45 somewhat reduces the bearing area of the ball and socket connection for links 18 but the ball area in the vicinity of the surface 46 is effective for the most part only during the oscillating component of the associated sleeve valve in one direction and not the reciprocating component of the sleeve movement, the resistance to oscillation being materially less than the resistance to reciprocation. Consequently the loss in bearing area at the ball and socket would not be detrimental to the desired wearing qualities of this mechanism.

What I claim as my invention is:

1. In an internal combustion engine having a plurality of cylinders and associated valve operating mechanisms, a valveshaft extending longitudinally of the engine, actuators spaced longitudinally of said valveshaft for respectively actuating the valve operating mechanisms for said cylinders, said valveshaft having intermediate and end bearings, bearing housing structures of the non-split type having openings respectively journalling the valveshaft bearings, the diameter of the valveshaft intermediate bearing being less than the diameter of a circle traced by the outermost points of said actuators, said valveshaft being adapted for assembly while the said intermediate bearing housing structure is in its operative position.

2. In an internal combustion engine having a plurality of cylinders and associated valve operating mechanisms, a valveshaft extending longitudinally of the engine, actuators spaced longitudinally of said valveshaft for respectively actuating the valve operating mechanism for said cylinders, said valveshaft having end bearings and one or more intermediate bearings, bearing housing structures of the non-split type having openings respectively journalling the valveshaft bearings, the diameter of the valveshaft intermediate bearing being less than the diameter of a circle traced by the outermost points of said actuators, the openings of a plurality of said housing structures decreasing progressively in diameter toward one end of the valveshaft, said valveshaft being adapted for assembly while the said intermediate bearing housing structure is in its operative position.

3. In an internal combustion engine having a plurality of cylinders and associated valve operating mechanisms, a valveshaft extending longitudinally of the engine, actuators spaced longitudinally of said valveshaft for respectively actuating the valve operating mechanisms for said cylinders, said valveshaft having intermediate and end bearings, bearing housing structures having openings respectively journalling the valveshaft bearings, the diameter of the valveshaft intermediate bearing being less than the diameter of a circle traced by the outermost points of said actuators, said valveshaft being adapted for assembly while the said intermediate bearing housing structure is in its operative position.

4. In an internal combustion engine having a plurality of cylinders and associated valve operating mechanisms, a valveshaft extending longitudinally of said valveshaft for respectively actuating the valve operating mechanisms for said cylinders, said valveshaft having intermediate and end bearings, bearing housing structures of the non-split type having openings respectively journalling the valveshaft bearings, the diameter of the valveshaft intermediate bearing being less than the diameter of a circle traced by the outermost points of said actuators thereby providing a relatively small rubbing speed of the said intermediate bearing in its housing structure, said valveshaft being adapted for assembly while the said intermediate bearing housing structure is in its operative position.

5. In an internal combustion engine having a plurality of cylinders and associated valve operating mechanisms, a valveshaft extending longitudinally of the engine, cranks spaced longitudinally of said valveshaft for respectively actuating the valve operating mechanisms for said cylinders, said valveshaft having intermediate and end bearings, bearing housing structures of the non-split type having openings respectively journalling the valveshaft bearings, the diameter of the valveshaft intermediate bearing being less than the diameter of a circle traced by the outermost points of said cranks, said valveshaft being adapted for assembly while the said intermediate bearing housnig structure is in its operative position.

6. In an internal combustion engine having a plurality of cylinders and associated valve operating mechanisms, a valveshaft extending longitudinally of the engine, ball cranks spaced longitudinally of said valveshaft for respectively actuating the valve operating mechanisms for said cylinders, said valveshaft having intermediate and end bearings, bearing housing structures of the non-split type having openings respectively journalling the valveshaft bearings, the diameter of the valveshaft intermediate bearing being less than the diameter of a circle traced by the outermost points of said ball cranks, said valveshaft being adapted for assembly while the said intermediate bearing housing structure is in its operative position.

7. In an internal combustion engine having a plurality of cylinders and associated valve operating mechanisms, a valveshaft extending longitudinally of the engine, ball cranks spaced longitudinally of said valveshaft for respectively actuating the valve operating mechanisms for said cylinders, said valveshaft having intermediate and end bearings, bearing housing structures having openings respectively journalling the valveshaft bearings, the diameter of the valveshaft intermediate bearing less than the diameter of a circle traced by the outermost points of said ball cranks, said valveshaft being adapted for assembly while the said intermediate bearing housing structure is in its operative position.

8. In an internal combustion engine having a plurality of cylinders and associated valve operating mechanisms, a valveshaft extending longitudinally of the engine, ball cranks spaced longitudinally of said valveshaft for respectively actuating the valve operating mechanisms for said cylinders, said valveshaft having intermediate and end bearings, bearing housing structures of the non-split type having openings respectively journalling the valveshaft bearings, the diameter of the valveshaft intermediate bearing being less than the diameter of a circle traced by the outermost points of said ball cranks, thereby providing a relatively small rubbing speed of the said intermediate bearing in its housing structure, said valveshaft being adapted for assembly while the said intermediate bearing housing structure is in its operative position.

9. In an internal combustion engine having a plurality of cylinders, a sleeve valve associated with each of said cylinders, a valveshaft extending longitudinally of the engine having ball cranks spaced longitudinally thereof, links connecting the respective ball cranks and sleeve valves for imparting to the sleeves a combined reciprocating and oscillating movement, said valveshaft having intermediate and end bearings, bearing housing structures of the non-split type having openings respectively journalling the valveshaft bearings, the diameter of the valveshaft intermediate bearing being less than the diameter of a circle traced by the outermost points of said ball cranks, said valveshaft being adapted for assembly while the said intermediate bearing housing structure is in its operative position.

10. In an internal combustion engine having a plurality of cylinders, a sleeve valve associated with each of said cylinders, a valveshaft extending longitudinally of the engine having ball cranks spaced longitudinally thereof, links connecting the respective ball cranks and sleeve valves for imparting to the sleeves a combined reciprocating and oscillating movement, said valveshaft having intermediate and end bearings, bearing housing structures of the non-split type having openings respectively journalling the valveshaft bearings, the diameter of the valveshaft intermediate bearing being less than the diameter of a circle traced by the outermost points of said ball cranks, the openings of a plurality of said housing structures decreasing progressively in diameter toward one end of the valveshaft, said valveshaft being adapted for assembly while the said intermediate bearing housing structure is in its operative position.

11. In an internal combustion engine having a plurality of cylinders and associated valve operating mechanisms, a valveshaft extending longitudinally of the engine, ball cranks spaced longitudinally of said valveshaft for respectively actuating the valve operating mechanisms for said cylinders, said valveshaft having intermediate and end bearings, bearing housing structures of the non-split type having openings respectively journalling the valveshaft bearings, the diameter of the valveshaft intermediate bearing being less than the diameter of a circle traced by the outermost points of said ball cranks, the outer portion of one of said ball cranks being cut away.

12. In an internal combustion engine having a plurality of cylinders and associated valve operating mechanisms, a valveshaft extending longitudinally of the engine, ball cranks spaced longitudinally of said valveshaft for respectively actuating the valve operating mechanisms for said cylinders, said valveshaft having intermediate and end bearings, bearing housing structures of the non-split type having openings respectively journalling the valveshaft bearings, the diameter of the valveshaft intermediate bearing being less than the diameter of a circle traced by the outermost points of said ball cranks, the outer portion of one of said ball cranks having a substantially flattened surface.

13. In an internal combustion engine having a plurality of cylinders, a sleeve valve associated with each of said cylinders, a valveshaft extending longitudinally of the engine having ball cranks spaced longitudinally thereof and having bearing portions adapted for assembly with a fixed intermediate bearing housing structure, links connecting the respective ball cranks and sleeve valves, the outer portion of one of said ball cranks being cut away to reduce the diameter of a circle traced by said ball cranks thereby permitting the assembly of said valveshaft with an intermediate bearing housing structure of minimum diameter.

14. In an internal combustion engine having a plurality of cylinders, a sleeve valve associated with each of said cylinders, a valveshaft extending longitudinally of the engine having ball cranks spaced longitudinally thereof and having bearing portions adapted for assembly with a fixed intermediate bearing housing structure, links connecting the respective ball cranks and the outer portion of one of said ball cranks having a substantially flattened surface to reduce the diameter of a circle traced by said ball cranks thereby permitting the assembly of said valveshaft with an intermediate bearing housing structure of minimum diameter.

15. In an internal combustion engine having a plurality of cylinders, a sleeve valve associated with each of said cylinders, a valveshaft extending longitudinally of the engine having ball cranks spaced longitudinally thereof, links connecting the respective ball cranks and sleeve valves, for imparting to the sleeves a combined reciprocating and oscillating movement, said valveshaft having intermediate and end bearings, bearing housing structures having openings respectively journalling the valveshaft bearings, the diameter of the valveshaft intermediate bearing being less than the diameter of a circle traced by the outermost points of said ball cranks, said valveshaft being adapted for assembly while the said intermediate bearing housing structure is in its operative position.

16. In an internal combustion engine having a plurality of cylinders, a sleeve valve associated with each of said cylinders, a valveshaft extending longitudinally of the engine having ball cranks spaced longitudinally thereof, links connecting the respective ball cranks and sleeve valves, said valveshaft having intermediate and end bearings, bearing housing structures of the non-split type having openings respectively journalling the valveshaft bearings, the diameter of the valveshaft intermediate bearing being less than the diameter of a circle traced by the outermost points of said ball cranks, said valveshaft being adapted for assembly while the said intermediate bearing housing structure is in its operative position.

In witness whereof, I hereunto subscribe my name this 29th day of March, A. D. 1928.

ARCHIE MACPHAIL NIVEN.